(No Model.) 3 Sheets—Sheet 1.
S. C. MENDENHALL.
MANUFACTURE OF GLASS ROLLERS.
No. 314,970. Patented Mar. 31, 1885.
FIG. I.
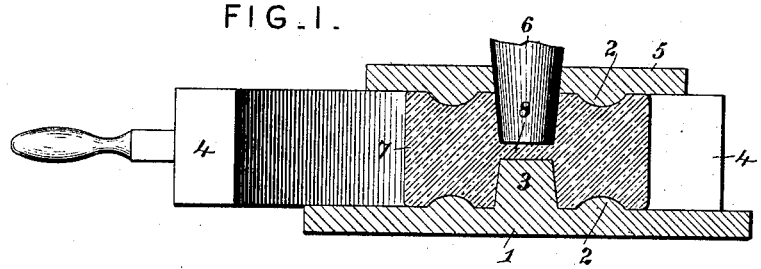
FIG. III.
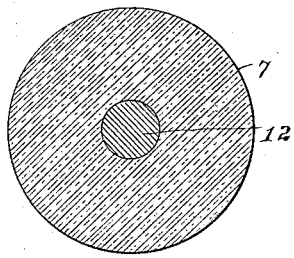
FIG. II.
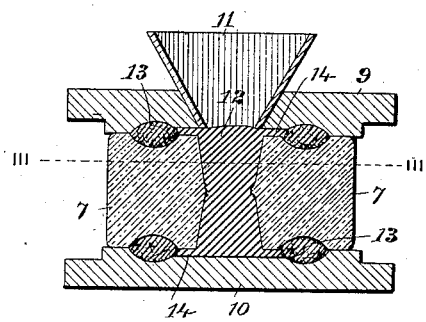
FIG. IV.
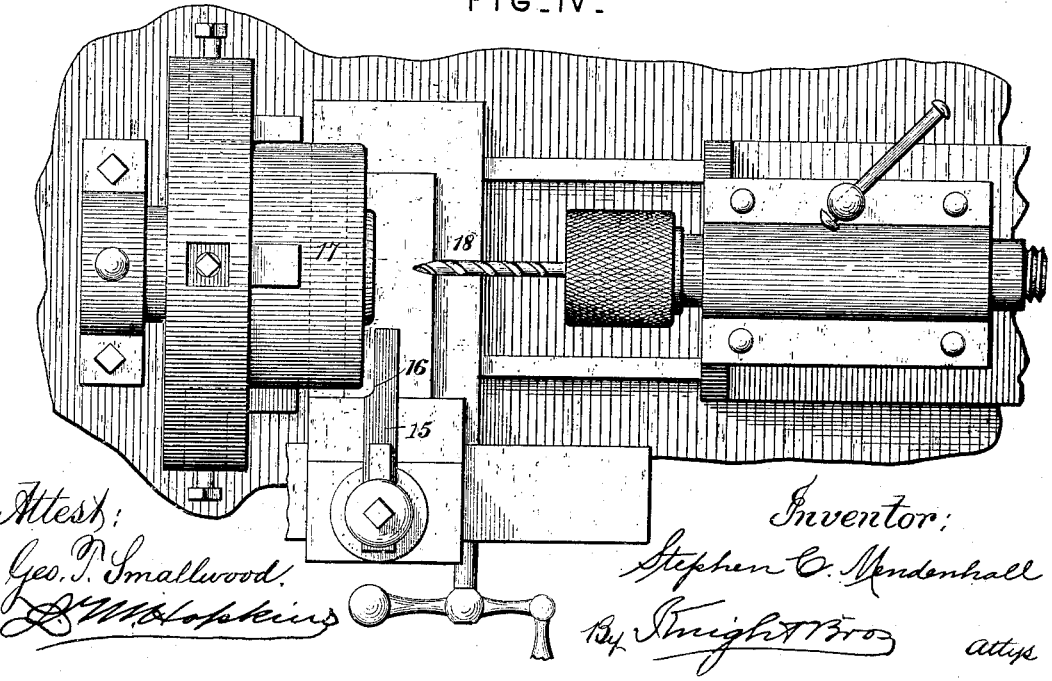
Attest:
Geo. T. Smallwood
L. M. Hopkins
Inventor:
Stephen C. Mendenhall
By Knight Bro
Attys

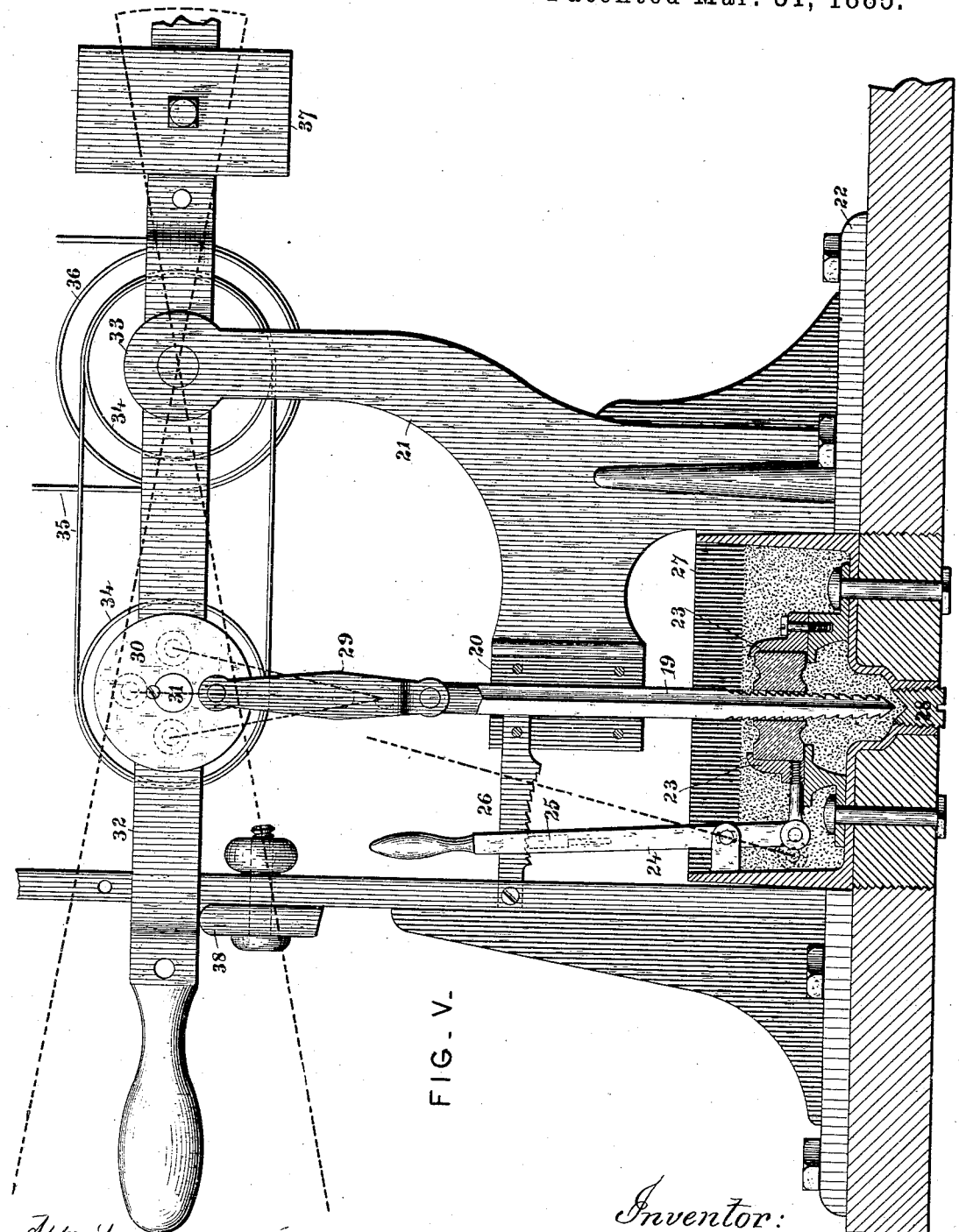

(No Model.)
S. C. MENDENHALL.
MANUFACTURE OF GLASS ROLLERS.
No. 314,970. Patented Mar. 31, 1885.
3 Sheets—Sheet 3.
FIG. VI.
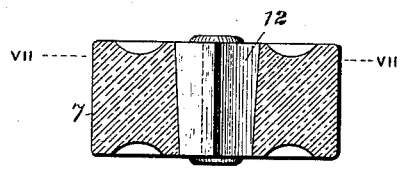
FIG. VII.
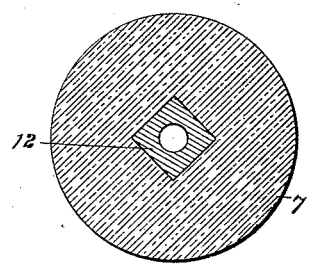
FIG. VIII.
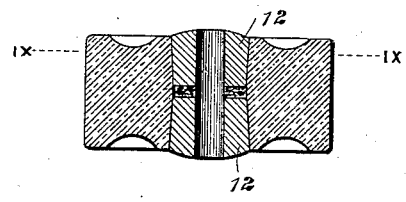
FIG. IX.
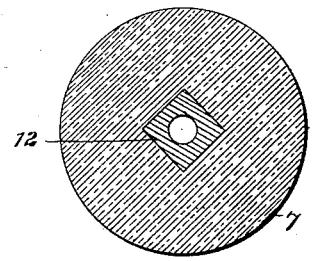
FIG. X.
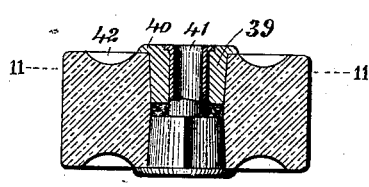
FIG. XI.
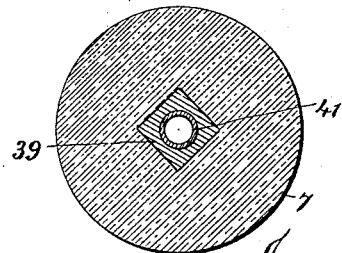
Attest:
Geo. T. Smallwood.
L. M. Hopkins.
Inventor:
Stephen C. Mendenhall
By Knight Bros
Attys ial opening and bushing the same in a durable manner. Bushings as heretofore applied have had the disadvantage of placing the glass under a strong initial strain, so as to render it liable to breakage, or else being so loosely applied as to be in danger of falling out or bearing unevenly upon the roller.

UNITED STATES PATENT OFFICE.

STEPHEN C. MENDENHALL, OF RICHMOND, INDIANA.

MANUFACTURE OF GLASS ROLLERS.

SPECIFICATION forming part of Letters Patent No. 314,970, dated March 31, 1885.

Application filed November 8, 1884. (No model.)

*To all whom it may concern:*

Be it known that I, STEPHEN C. MENDENHALL, a citizen of the United States, residing at Richmond, in the county of Wayne and State of Indiana, (present business address Cincinnati, Ohio,) have invented a certain new and useful Improvement in the Manufacture of Glass Rollers, of which the following is a specification.

In glass rollers which have heretofore been made difficulty has always been experienced in forming the ax My improvement consists in molding the roller with an axial opening, into which a bushing, preferably of square form, is poured or driven. The advantage of making the bushing of square form is that the bearing between the bushing and roller is more positive, and there is less likelihood of becoming loose, than where the bushing and its bearing are circular. Although, as stated, the bushing may be of square form and of wood, the preferred method of construction is to heat the glass after molding in an oven of any preferred construction, and while hot to pour in a bushing of Babbitt or other anti-friction metal, which is preferably so compounded as to have a coefficient of shrinkage equal to that of the glass, so that when both are gradually cooled in an annealing-oven the bushing will exactly fill the axial opening in the roller without putting the glass under any initial strain whatever.

In order that the invention may be more fully understood, I will proceed to describe it with reference to the accompanying drawings, in which—

Figure I is a sectional view of the preferred form of mold employed for forming the roller. Fig. II is a view of the mold employed for casting the bushing within the roller. Fig. III is a transverse sectional view of such a roller with a round bushing cast therein, and previous to the boring of the journal. Fig. IV is a plan view of the arrangement of lathe and tool for trimming and boring the bushing. Fig. V is a side elevation, partly in vertical section, of the apparatus employed to drill out irregularities resulting from the molding of the axial opening, so as to prepare it to receive the bushing. Fig. VI is an axial sectional view of a roller having a square metallic or wooden bushing driven or cast therein. Fig. VII is a transverse section of the same. Figs. VIII to XI represent axial and transverse sections of modified forms of bushings.

Fig. I represents the mold employed for casting the roller. The said mold consists of a base-plate, 1, having an annular ridge, 2, and a central stud, 3. 4 are the jaws of the mold, one being shown thrown open. 5 is the cap-plate, having an annular ridge, 2, similar to the base-plate. 6 is a plunger.

The method of operating the mold is as follows: The jaws 4 being brought together and cap-plate 5 swung around out of the way, a ball, 7, of molten glass is dropped into the mold, the cap-plate 5 completely swung around into place, and plunger 6 brought down. It will be seen that forcing down the plunger forces the glass into all the corners of the mold, and that a narrow neck, 8, will be left, of thickness depending upon the surplus of glass in the molten ball. When the roller is removed from the mold, the web 8 is broken out, leaving the irregular broken portion in the center of the roller shown in Fig. II.

I have found that a roller molded as above always possesses slight irregularities in the axial opening, due in large part to the settling of the glass while yet soft; and it is apparent that if a bushing be now cast into the roller the irregularities of the opening will serve to assist in maintaining the bushing in position. The roller is therefore heated, so as to prevent its being fractured when the bushing is poured in, and placed in the mold shown in Fig. II, consisting of top and bottom plates, 9 10, through the center of the former of which passes the pouring-hole 11. Both top and bottom plates are provided with annular grooves to correspond with similar depressions in the glass roller. When the plates and rollers are placed together, therefore, it will be seen that annular openings will be left, which are filled with clay 13, or other suitable material, to retain the molten Babbitt or other metal used as a bushing within the proper space. The antifriction metal employed is preferably so alloyed as to possess a coefficient of shrinkage equal to the glass, so that when both have cooled off there will be no initial strain upon the glass. It will be seen that the arrangement of the mold is such that the bushing will flow outside of the roller on both sides to form collars or flanges 14, which cover any irregularities in the edge of the glass, and further assist in preventing the bushing from falling out, and in bracing and strengthening the roller. After the bushing is cast, it is removed from the mold shown in Fig. II and placed in the lathe shown in Fig. IV, where a tool, 15, adapted to be operated in the ordinary manner, may have its cutting-edge 16 forced up against the flanges of the bushing for trimming and rounding them off, the roller being for that purpose fixed in the chuck 17 in ordinary manner. The roller being accurately centered in the chuck, it is apparent that after or before the bushing is trimmed the journal therein may be accurately bored by advancing the bit 18 on the tail-stock of the lathe.

In Fig. III is shown a transverse section of the bushed roller previous to boring. In this figure the bushing is shown circular in cross-section. It is apparent that the process of forming the bushing just described is applicable as well to a bushing of this form as any other; but it is preferred to make the bushing square in cross-section, as illustrated in Figs. VI to XI. To this end the plunger 6 in the mold, Fig. I, may be either round or square in cross-section. If it be square, or approximately so, some labor will necessarily be saved in subsequently trimming out the opening to square form.

The machine employed for dressing the axial opening after molding is shown in Fig. V, and it may be employed, as shown here, to dress a roller with an opening tapering throughout, or by reversing the roller when the dressing operation is half completed the axial opening may be made to flare outwardly from the center on both sides. The tool here employed for dressing is a reciprocating drill whose working-face may be milled or not, and may be square or round in cross-section, according to the shape of opening desired for the roller. The drill is shown at 19 adapted to work vertically in a head, 20, on a standard, 21, fixed to or cast with the base-plate 22, as preferred. The roller to be dressed is fixed in an adjustable clamp, 23, operated by a lever, 24, which is fixed in any position desired by spring-bolt 25 and rack-bar 26. It will be understood that the jaws 23 of the clamp are semi-circular in form, to clasp the sides of the roller and hold it firmly while being dressed. The clamp and roller are placed in a tub, 27, containing turpentine or water and emery, or other suitable material, to assist in the abrading operation. A plug, 28, at bottom may be withdrawn when it is desired to discharge dirt and filings accumulating in the tub. It will be observed that the lower working extremity of the drill is toothed, this construction being such that the liquid in the tub is constantly forced up through the roller and a circulation thereby maintained. At its upper end the drill 19 is coupled with a connecting-rod, 29, the other end of which surrounds a wrist on a crank-disk, 30, keyed to a shaft, 31, which has bearing horizontally in the gravitating arm 32. The arm 32 is pivoted by a second shaft, 33, journaled in a projection on the frame 21. Said arm is formed of two parallel bars, between which on the said shafts are keyed pulleys 34, receiving motion from the counter-shaft by belts 35 and pulley 36. It will be seen that by this arrangement the relative position of the pulleys 34 is not altered by the rise and fall of the arm 32 during the operation of drilling. Said arm has on its rearwardly-projecting end a sliding weight, 37, which may be fixed at any desired point, so as, however, always to leave the forward end of the arm slightly in excess in weight. When a roller is clamped in position, the drill dropped into place and rapidly reciprocated, the arm 32 will gradually feed downward until arrested by a stop, 38, which is fixed at such a point as will secure the dressing of the roller to the desired extent.

After the dressing is completed the roller is removed, dried, and the bushing either cast or driven in. It may be made of wood or other material, so long as its shape is maintained square in cross-section, and may be formed of a single tapering strip, as shown in Fig. IV, or of two oppositely-tapered sleeves, as shown in Figs. VIII and IX. In the former case it is held into the roller by means of cement. In the latter plaster-of-paris is employed for filling in crevices that may remain when the two sleeves are forced in. In Fig. X, I have shown one form of square bushing for rollers, consisting of two sleeves, 39, square in cross-section, held in place by plaster-of-paris, by down-turned flanges 40 on the sleeves, and by a spun-over tubular bushing within the sleeves. In putting a bushing of this form into the roller a small quantity of plaster-of-paris is first placed in the axial opening, the loose sleeves 39 then forced in from opposite sides, so as to compress the plaster-of-paris into any interstices, and the tube 41 then forced in and its ends turned over in such a manner as to hold the sleeves together and press them firmly down onto the roller. It is obvious that with a bushing of this form the flanges 40 may be made of such width as to largely aid in strengthening the glass roller. The rollers are rendered light, while at the same time their strength is not detracted from by casting annular depressions 42 therein, as already described.

Having thus described my invention, the following is what I claim as new therein and desire to secure by Letters Patent:

1. The process of forming glass rollers, which consists in molding the glass with an axial opening oppositely tapered from the center, breaking out the intervening web, and subsequently applying a bushing of suitable material, substantially as described.

2. The process of forming a bushed glass roller, which consists in forming the roller with an axial opening, heating the roller, and then casting a metal bushing therein, substantially as described.

3. A glass roller having an axial opening polygonal in cross-section, and a correspondingly-shaped bushing applied thereto after the formation of the roller, substantially as described.

4. A glass roller molded with annular depressions or grooves formed in the sides thereof for lessening the weight without impairing the strength of the roller, substantially as described.

STEPHEN C. MENDENHALL.

Witnesses:
HARRY E. KNIGHT,
EDWARD STEER.